July 14, 1925.  1,545,869
F. WEIDERT
PHOTOGRAPHIC CAMERA
Filed Nov. 4, 1922
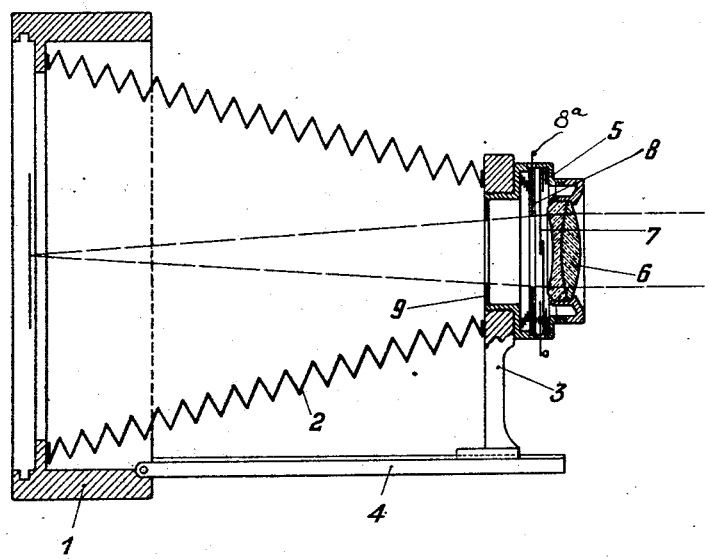
Inventor:
Franz Weidert
by
Leo J. Hatty
Atty.

Patented July 14, 1925.

1,545,869

UNITED STATES PATENT OFFICE.

FRANZ WEIDERT, OF ZEHLENDORF-WEST, NEAR BERLIN, GERMANY, ASSIGNOR TO OPTISCHE ANSTALT C. P. GOERZ ATKIENGESELLSCHAFT, OF FRIEDENAU, NEAR BERLIN, GERMANY, A FIRM.

PHOTOGRAPHIC CAMERA.

Application filed November 4, 1922. Serial No. 599,010.

*To all whom it may concern:*

Be it known that I, Dr. FRANZ WEIDERT, a citizen of the German Republic, and resident of Zehlendorf-West, near Berlin, Germany, physicist, have invented certain new and useful Improvements in or Relating to Photographic Cameras (for which I have filed patent application in Germany, June 2nd, 1921; Great Britain, September 23rd, 1922; France, September 27th, 1922, and Italy, September 26th, 1922), of which the following is a specification.

It is possible to obtain comparatively good photographic images with simple achromatic lens systems if same are used in combination with diaphragms arranged at a certain distance in front or at the back of the lens, the diaphragm cutting out the rays detrimental to the marginal definition of the image. The use of such image correcting diaphragms, however, conflicts in some way with the constructional requirements of photographic cameras, and more particularly those known as folding cameras. According to these constructional requirements the camera must be provided with an adjustable diaphragm to suit the various conditions of light and to obtain sufficient depth of definition with objects of large dimensions. Moreover the said adjustable diaphragm must be at a comparatively small distance from the lens, since the greater the said distance, the greater is the difficulty of arranging the bellows and the less compact is the camera.

According to this invention the difficulties are overcome thereby that the camera is provided with two diaphragms one adjustable and the other non-adjustable, as well in aperture as in distance from the lens, the latter being positioned on the same side of the lens than the former and at a greater distance therefrom. The distance of said non-adjustable diaphragm from the lens and its aperture being so correlated to each other that the non-corrected marginal rays of the oblique pencils of light passing through the lens and through the adjustable diaphragm in a direction which would allow them to meet the free space of the rear wall of the camera containing the sensitive layer are cut off. The cutting off of said non-corrected marginal rays of oblique pencils having the effect that these marginal rays are prevented from producing chromatical aberrations in the image as they would do if they were not cut off. Such non-adjustable diaphragm does in no way interfere with the constructional requirements as regards the adjustable diaphragm of the shutter and other essentials, so that the adjustable diaphragm can be arranged and operated in usual manner to suit the varying conditions of light and to obtain a sufficient depth of definition.

A substantially diagrammatic illustration of a construction according to the invention is given in the accompanying drawing as an example of a folding camera provided with an achromatic lens and a rear or additional diaphragm.

The camera comprises a body 1, bellows 2 and a lens-board 3 guided as in all usual folding cameras on the hinged base-board 4. The lens-board carries a shutter casing 5 in which is mounted a simple achromatic lens 6. The shutter leaves 7 and the diaphragm 8 are located in the shutter casing fairly close behind the lens. According to the invention moreover the shutter casing 5 is provided with a rear or additional diaphragm 9 which is at a greater distance from the lens than the adjustable diaphragm 8 with adjusting member $8^a$. As the said rear or additional diaphragm 9 needs no casing projecting beyond its full aperture (as is the case with an adjustable diaphragm) the provision of the afore-mentioned non-adjustable diaphragm offers no constructional difficulties and may be fitted to any kind of camera provided with bellows. Moreover a non-adjustable diaphragm as described needs no supporting structure in the space enclosed by the bellows so that the compactness of the camera is not in the least affected by the arrangement of the said additional diaphragm.

What I claim is:—

1. In a photographic camera the combination with the simple achromatic lens of two diaphragms one adjustable in aperture and the other non-adjustable as well in aperture as in distance from the lens, both diaphragms located on the same side of the lens and the non-adjustable diaphragm being of such size and so positioned at a greater distance from the lens that it cuts off the marginal rays of oblique pencils of light passing through the lens and through the adjustable diaphragm in such direction that they would directly meet the free space of the rear wall of the camera if not cut off.

2. In a photographic camera the combination with a simple achromatic lens of two diaphragms located on the rear side of the lens, one being adjustable and the other non-adjustable as well in aperture as is distance from the lens, the non-adjustable diaphragm being of such size and so positioned at a greater distance from the lens than the adjustable diaphragm that it cuts off the marginal rays of oblique pencils of light passing through the lens and through the adjustable diaphragm in such direction that they would directly meet the free space of the rear wall of the camera if not cut off by said non-adjustable diaphragm.

In testimony whereof I have signed this specification in the presence of two subscribing witnesses.

Dr. FRANZ WEIDERT.

Witnesses:
 REGR. T. AUSPACH,
 ARTHUR SCHROEDER.